(12) United States Patent
Fujikawa

(10) Patent No.: US 6,468,449 B1
(45) Date of Patent: Oct. 22, 2002

(54) MOLD CLAMPING APPARATUS FOR INJECTION MOLDING MACHINES AND MOLD-OPENING CONTROL METHOD THEREFOR

(75) Inventor: Misao Fujikawa, Ishikawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/530,108

(22) PCT Filed: Aug. 24, 1999

(86) PCT No.: PCT/JP99/04551

§ 371 (c)(1),
(2), (4) Date: Jul. 6, 2000

(87) PCT Pub. No.: WO00/10792

PCT Pub. Date: Mar. 2, 2000

(30) Foreign Application Priority Data

Aug. 25, 1998 (JP) .......................................... 10-239106

(51) Int. Cl.[7] .............................................. B29C 45/64
(52) U.S. Cl. ................... 264/40.1; 264/328.1; 425/150; 425/595
(58) Field of Search ............................. 264/40.1, 40.5, 264/328.1, 334; 425/150, 595, 451.9

(56) References Cited

U.S. PATENT DOCUMENTS 4,636,167 A * 1/1987 Shibata .................... 425/450.1
5,133,655 A * 7/1992 Schad et al. ................. 425/150
5,620,723 A * 4/1997 Glaesener et al. ........... 425/595
5,853,773 A * 12/1998 Choi .......................... 425/150
6,200,123 B1 * 3/2001 Mailliet et al. ............. 425/150

FOREIGN PATENT DOCUMENTS

| JP | 63-260415 | 10/1988 |
| JP | 7-186224 | 7/1995 |
| JP | 7-50180 | 11/1995 |
| JP | 8-267523 | 10/1996 |
| JP | 9-29802 | 2/1997 |
| JP | H11-291311 | 10/1999 |

* cited by examiner

Primary Examiner—Jill L. Heitbrink
(74) Attorney, Agent, or Firm—McDermott, Will & Emery; Paul Devinsky

(57) ABSTRACT

An injection molding machine mold clamping device (1) comprising an electromechanical mold opening and closing mechanism, a hydraulic mold clamping. mechanism, and a mold thickness adjustment device, said mold thickness adjustment device comprising a first detection device (70) for detecting the position of a mold clamping ram (51), a second detection device (90) for optically detecting the position of a half nut device (20), and a mold clamping ram position control device (90) for hydraulically holding and controlling the position of the mold clamping ram (51). The position of the half nut device (20) is held by hydraulic control at the mold thickness adjustment position during mold opening and closing. In the initial mold opening and closing operation, the large mold opening force exerted by the mold clamping ram (51) may be used to open the mold.

4 Claims, 8 Drawing Sheets

MOLD CLAMPING APPARATUS FOR INJECTION MOLDING MACHINES AND MOLD-OPENING CONTROL METHOD THEREFOR

FIELD OF THE INVENTION

The present invention relates to a mold clamping apparatus and mold opening control method for injection molding machines. More particularly, the present invention relates to a hybrid mold clamping apparatus and mold opening control method which takes advantage of the structure thereof, whereby the mold opening and closing action is electro-mechanically implemented, and the mold clamping action is hydraulically implemented.

BACKGROUND OF THE INVENTION

As a basic structure for electromechanical mold clamping devices, the mold opening and closing action and the mold clamping action are performed by rotating a ball screw axle using a servo motor, thus moving a movable platen integrally formed with a ball nut which fits onto the ball screw axle. In this type of structure, an extremely large mold-clamping force acts on the ball screw and the ball nut, such that a high-load ball screw is required.

In contrast to this, a mold clamping apparatus has been disclosed in Japanese Patent application H9-29802, in which the mold clamping mechanism is equipped with a mold clamping axle having a trapezoidal screw, angle screw, etc. separate from the ball screw-driven mold opening and closing mechanism, and where the mold clamping force from a hydraulic cylinder operates on the mold clamping axle to clamp a mold. This is a "hybrid" mold clamping apparatus, in which the mold opening and closing mechanism and the mold clamping mechanism are independently constituted. In such a mold clamping apparatus, mold clamping force load will be distributed over an angle screw or trapezoidal screw making surface contact, and no large mold clamping force is loaded on the mold opening and closing ball screw. However, with this type of mold clamping apparatus, the mold clamping axle and the mold clamping nut rub one another during the mold opening and closing operations, whereby frictional resistance is generated between the angle screw, etc. and the nut, whereby drive energy is lost, wear on the screw is created, etc.

Similarly, mold clamping apparatuses into which mold-clamping mechanisms are built around respective multiple tie bars are publicly known through Japanese Utility Model H7-11944 and Japan Patent 2511111 as mold clamping apparatuses in which the mold opening-closing mechanism and the mold clamping mechanism are separately constituted. Such mold clamping mechanisms are equipped with at least a tie bar, a half nut capable of fitting this tie bar, and a mold clamping cylinder which moves the half nut or the tie bar back and forth. When the mold is closed, these half nuts engage the respective tie bar angle screw threads, and the mold clamping cylinder pulls on the tie bar affixed by the half nut to the mold. However, such mold clamping apparatuses have multiple mold clamping mechanisms, and the mold thickness must be adjusted to be equal so that the respective mold clamping mechanisms are equal in order that the respective half nuts equally engage the tie bar angle screw threads during mold clamping. A mold thickness adjustment apparatus which synchronizes and adjusts the mold thickness is therefore required, thus increasing the number of parts in the mold clamping apparatus and requiring more effort for initial assembly adjustment and maintenance of the mold clamping apparatus.

As a partial solution to these problems, the present inventor described in Japanese Patent application H10-108616 for a mold clamping apparatus as shown in FIG. 8.

The mold clamping mechanism comprises a mold opening and closing screw axle 41, which is a ball screw, a mold opening and closing nut 42, which is a ball nut, a mold clamping axle 31 having a movable platen 4, which are attached or integral pieces. Rotational driving of the mold opening and closing screw axle 41 by a servo motor 11 causes the movable platen 4 to advance and retreat to open and close the mold.

The mold clamping mechanism is also equipped with a mold clamping ram 15 contained in a support platen 3, having a half nut device 20 attached at its end. During mold clamping operations, a mold clamping ram 51 receives the mold clamping load over the entire surface of the annular convex portion (annular tooth portion) of the mold clamping axle 31 through the half nut 21 of the closed half nut device 20.

A mold thickness adjustment device 60 comprises a servo motor 61 having a rotary rotary encoder and a brake. A flat gear 65 is rotated by the servo motor causing a cylindrical member 64 to come in and out of contact with the mold clamping ram 51.

A proximity switch 81 is attached to the front end of the half nut device 20. Mold thickness adjustment is performed in order to set and adjust the position of the half nut 21 such that the half nut 21 and the mold clamping axle 31 mesh well when the half nut 21 is tightened at the completion of the mold closing operation.

During the mold thickness adjustment, the servo motor 61 advances the cylindrical member 64. The mold clamping ram 51 which is in contact therewith similarly advances. A proximity switch 81 advances with the half nut device 20. During this forward advance, the proximity switch 81 detects the position at which the half nut 21 and the mold clamping axle 31 mesh well. That position is set in the injection molding machine control device as the mold thickness adjustment position. During subsequent mold opening and closing operations, the cylindrical member 64 limits the advance and retreat positions of the mold clamping ram 51, holding the position of the half nut 21 at the mold thickness adjusted position.

In the above-described mold clamping apparatus, the mold opening and closing mechanism and the mold clamping mechanism are coaxially arrayed compactly on the center axis of the mold clamping device. Movement of the movable platen 4 during mold opening and closing is therefore carried out with a high degree of straightness, and the mold clamping force applied during clamping is accurately applied to the center of the movable platen 4. The half nut 21 is completely open during mold opening and closing operation, so that movement of the movable platen 4 at a high speed and a low frictional resistance is effected without contact between the half nut 21 and the mold clamping axle 31. Furthermore, the mold thickness adjustment device 60 is compactly arranged on the center axis of the mold clamping device, so that there are few mold clamping device parts. This, of course facilitates assembly adjustment, maintenance, and mold thickness adjustment.

However, in the mold thickness adjustment device 60, the retracted mold clamping ram 51 is positioned by mechanical contact with the cylindrical member 64 which is held at the mold thickness adjustment position. Thus, the half nut 21 is held in a position at which it meshes with the mold clamping axle 31. Therefore, the cylindrical member 64 is positioned in the direct vicinity of the rear side of the mold clamping ram 51 at the time of mold clamping. Therefore, if molten resin overfills the die cavity, resulting in an overpack, when the mold clamping ram 51 retracts, it will contact the cylindrical member 64 and be unable to retract further. As a result, as the support platen 3 retreats, a large tension will be imposed on the tie bars 5. In the worst case, this can cause the tie bars 5 to break. It may also be difficult to remove the overpack state as the half nut many not open.

It is therefore an object of the present invention to provide a mold clamping device which has the basic structure of the single mold opening and closing mechanism and single mold clamping mechanism as described in Japanese Patent Application H10-108618, having an improved mold thickness adjustment mechanism whereby accurate positioning and holding of the platen may be achieved using a simple control device which does not rely on mechanical positioning of a half nut device for mold thickness adjustment positioning during mold opening and closing. It is a further object of the present invention to provide a mold clamping device in which overpacking can be easily removed should it occur during injection filling, and where overpacking will not cause an undue strain on the tie bars. It is yet a further object of the present invention to provide a mold clamping device in which assembly, adjustment, and maintenance of the mold thickness adjustment device is easily effected. Yet a further object of the present invention is to provide a mold opening control method where a large mold opening force can be generated as needed at the commencement of the mold opening operation, using a mold clamping device according to the present invention.

SUMMARY OF THE INVENTION

An injection molding machine mold clamping apparatus according to the present invention includes a mold clamping apparatus having an axis and a mold opening and closing mechanism having a mold opening and closing screw axle coaxial with said axis. The mechanism includes a ball screw and is axially supported by a support platen. A mold opening and closing nut meshes with the ballscrew. A mold clamping axle attached the mold opening and closing nut, includes, on its outer circumference, square or trapezoidal annular protuberances at a fixed pitch. A movable platen is integrally formed with the mold clamping axle, and a servo motor controls the rotation of the mold opening and closing screw axle. A mold clamping mechanism having a mold clamping ram on the support platen and a half nut device having a half nut which meshes with the annular protuberance in the mold clamping axle is attached to the end of the mold clamping ram. state. Mold clamping is performed by pushing the mold clamping axle, using hydraulic force of the mold clamping ram, mediated by the half nut, with the half nut device in a closed state.

A mold thickness adjustment device, comprises a first detection device which detects the relative position of the mold clamping ram with respect to the support platen and a second detection device, which optically detects the position at which the half nut device engages the mold clamping axle. A mold clamping ram position control device hydraulically controls the holding of the mold clamping ram at a mold thickness adjustment position at which the half nut engages the mold clamping axle.

With this structure, the mold clamping ram position control device hydraulically holds the mold clamping ram at the mold thickness adjustment position during mold opening and closing, and accurately holds the half nut device at the mold thickness adjustment position. Retraction of the mold clamping ram, in case overpacking occurs during injection filling, is allowed, so that overpacking can be easily removed.

The mold thickness adjustment device has a simple structure comprising a first detector, a second detector, and a mold clamping ram position control device; therefore assembly and maintenance of the mold thickness adjustment device may be easily accomplished, and mold thickness adjustment is itself simple.

A mold clamping ram position control device according to the present invention may comprise a switchover valve, which controls switchover of hydraulic fluid supplied to the mold clamping-side oil chamber and the mold opening-side oil chamber on the mold clamping ram, a flow control valve, a pressure control valve, and a pilot check valve. With this structure, the mold clamping ram position control device may take advantage of known mold clamping apparatus hydraulic devices.

The second detection device according to the present invention may comprise an optoelectric detector on the half nut device half nut, wherein a light beam through-hole is formed on the half nut, through which detected light between the optoelectric detector light projection element and a light receiving element can pass.

The detection light beam for the second detection passes through the half nut light beam through-hole, making it unlikely that the second detector will receive external noise. Also, because the second detection device is attached to the half nut directly, it is unlikely that it will protrude forward of the half nut device, eliminating the need of allowing extra length in the mold clamping apparatus.

The mold opening and closing control method according to the present invention is characterized in that it permits selection between two modes: a standard mode in which the mold opening operation is performed by a servo motor, and a strong mode in which the mold opening operation is initially performed by the mold clamping ram.

The mold opening operation is thus selected and controlled, so that when the required mold opening force at the commencement of the mold opening operation is large i.e., the strong mode, the mold clamping ram is caused to retract hydraulically at the commencement of mold opening, such that the half nut device pulls the mold clamping axle, and the mold opening operation is performed using a large mold opening force. The mold opening force is accurately hydraulically controlled, and no large mold opening force load will be distributed over the mold opening and closing mechanism.

BRIEF DESCRIPTION OF FIGURES

FIG. 3A is a front view showing the details thereof; FIG. 3B is a section through X—X in FIG. 3A; FIG. 3C is a section through Y—Y in FIG. 3A.

FIGS. 7A and 7B depict positional relationships when mold thickness adjustment has not been performed; FIG. 7C depicts positional relationships when the second detection device detection light beam escapes the interference by the corner of an annular protuberance 31a; FIG. 7D depicts the positional relationships of FIG. 7C when the half nut is closed; FIG. 7E depicts the positional relationships when the mold clamping ram advances and the half nut teeth contact the mold clamping axle annular protuberances; FIG. 7F depicts the positional relationships when the mold clamping ram has returned to the mold thickness adjustment position.

PREFERRED EMBODIMENT OF THE INVENTION

Figure 1:
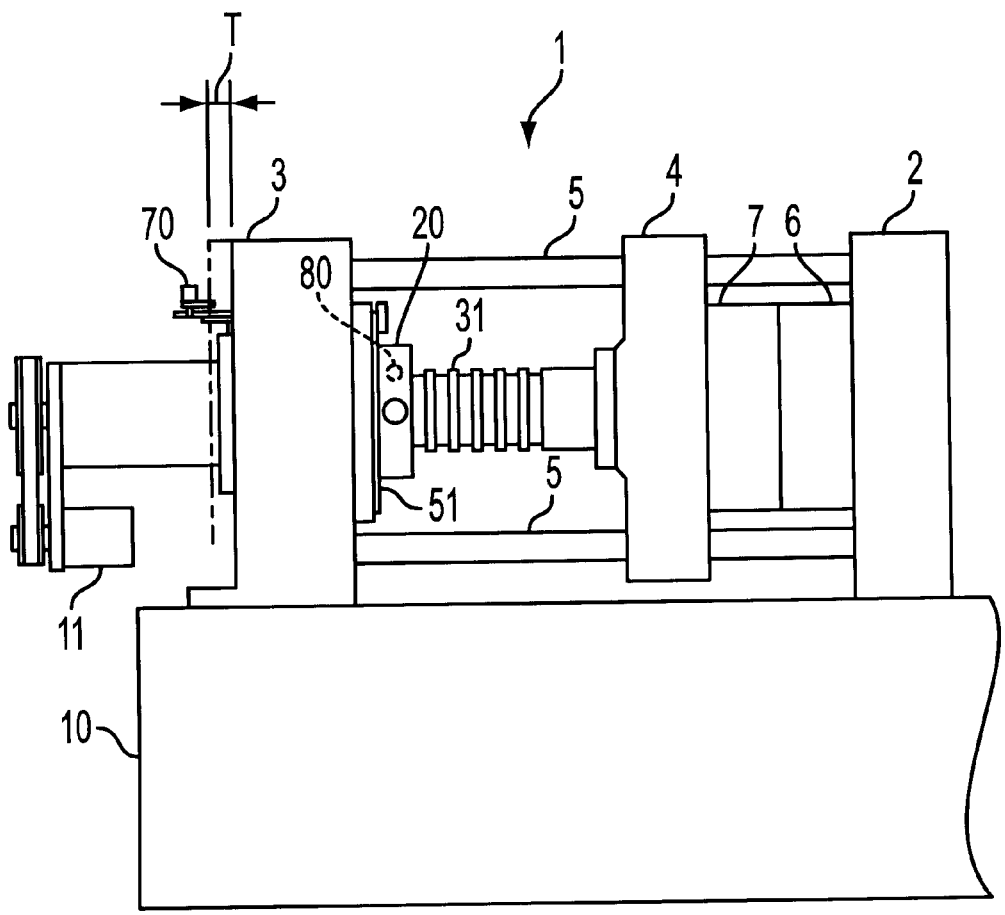
FIG. 1 is an overall summary side view of a mold clamping device according to the present invention, showing the mold closed.
Figure 2:
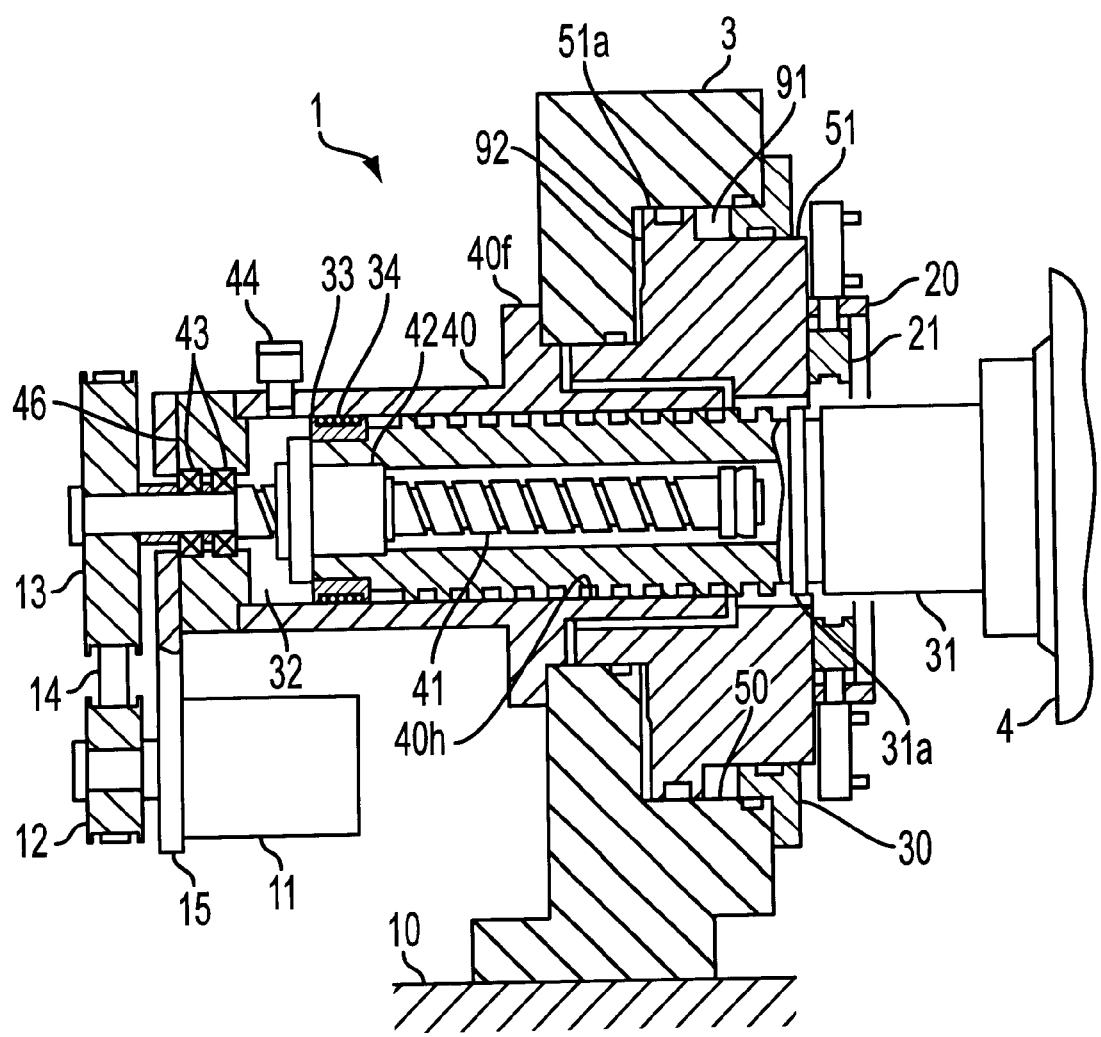
FIG. 2 is a side view in partial section, of the main portions behind the movable platen of a mold clamping device according to the present invention, showing the mold open.

An injection molding machine mold clamping apparatus according to the present invention is shown in FIGS. 1 and 2. The discussion below will refer to the right side as the front and movement toward the right as advancement.

A mold clamping apparatus 1, shown in summary in FIG. 1, comprises a fixed platen 2 affixed to a machine base 10 and a support platen 3 supported on the machine base 10 so as to rub slightly as it moves; a movable platen 4 supported so as be movable along four tiebars 5 which bridge between the fixed platen 2 and the support platen 3. During a mold clamping operation, the tie bar 5 stretch by a mold clamping allowance T in accordance with the mold clamping force, and the support platen 3 retracts by the same distance. Reference numeral 6 denotes a fixed die; reference number 7 denotes a movable die.

As shown in FIG. 2, a generally tubular back support member 40 includes, at the rear side of the support platen 3, a flange portion 40f, which extends about the tubular support member 40. On the inner side of the tubular support member 40, there is formed a cylinder surface 40h which passes through the flange member 40f. A pair of bearings 43 are housed in a back end member 46, which blocks the back end of the back support member 40. A mold opening and closing screw axle 41 is axially supported so as to freely rotate on the bearings 43. A ball screw is formed along the majority of the circumference of the mold opening and closing screw axle 41. A pulley 13 is affixed to the axle head at the back end thereof. A servo motor 11 is affixed to the motor attachment piece 15 attached to the back end member 46, and a pulley 12 is affixed to the output axle of the servo motor. A timing belt 14 is tensioned between the pulley 12 and the pulley 13. An encoder is built into the servo motor 11, by which the position of the movable platen 4 may be detected. The servo motor 11 is controlled by an injection molding machine control device (not shown) to perform mold opening and closing operations. The position of the movable platen 4 may be detected relative to the machine base 10 or the fixed platen 2, and can also be directly detected by means of a linear encoder (not shown) or by a rack and corresponding engaging pinion with a rotary encoder.

The mold clamping axle 31 is coaxially affixed to the rear side of the movable platen 4, and annular protuberances 31a (annular teeth) which may be square or trapezoidal in section, are formed on the external perimeter of the mold clamping axle 31 at a fixed pitch. Hollow holes are also formed along the axial center of the mold clamping axle 31. The mold opening and closing nut 42 is affixed to the back end of the mold clamping axle 31. The mold opening and closing nut 42 is a ball screw nut, which threads onto the mold opening and closing screw axle 41.

A back end piece 33 is attached, preferably integrally, to the back end of the mold clamping axle 31, and a sliding hub bushing 34 is positioned within it. The back end piece 33 is guided so as to be movable within the inner cylinder surface 40h of the back support member 40, mediated by the sliding hub bushing 34. A determined volume of lubricating oil is stored in an air chamber 32, which is enclosed by the inner cylinder surface 40h of the back support member 40, the back end member 46, the mold clamping axle 31 back end piece 33, and the mold opening and closing nut 42. An air breather 44 is positioned in a through-hole formed in the back support member 40 at the top of the above described chamber. The air breather 44 allows air in the air chamber 32 to pass in and out when there is a change in the volume of the air chamber 32 with movement of the mold clamping axle 31. In this manner, the mold clamping axle 31 sliding hub bushing 34 is lubricated in a state close to that of oil bath lubrication. The air chamber 32 lubricating oil should preferably be supplied in very small volume with the mold opening and closing operation by means of a bellows pump having a bellows driven so as to expand and contract with each mold opening and closing operation.

The mold opening and closing screw axle 41, which is preferably a single ball screw, is thus positioned coaxially around the center axis of the mold clamping device. The mold clamping axle 31, which houses the mold opening and closing nut 42 which is threaded thereon, is provided at the center of the movable platen 4, and the mold clamping axle 31 is guided so as to be coaxially movable with the inner cylinder surface 40h of the back support member 40, in such a way that its rubbing friction is extremely small. When the mold opening and closing screw axle 41 is rotationally driven by the servo motor 11, the movable platen 4, which moves with the mold opening and closing nut 42, can move in a straight manner, mediated by the mold clamping axle 31, and with almost no rubbing friction imparted to it.

A mold clamping cylinder hole 50 is formed on the support platen 3. A mold clamping ram 51 is housed therein so as to be able to advance and retract. A flangeshaped front end support piece 30 forms a liquid seal and blocks the mold clamping cylinder hole 50, while also supporting the mold clamping ram 51 in a liquid-sealed state. A mold opening oil chamber 91 and a mold closing oil chamber 92 are formed around a piston 51a of the mold clamping ram 51. Hydraulic oil is supplied from a mold clamping ram position control device described below. The mold clamping ram 51 movement stroke should be selected to be greater than a stroke which is one pitch or more of the annular protuberance 31a of the mold clamping axle 31, plus a stroke which exceeds the mold clamping allowance T. This is so that during mold thickness adjustment, described below, the mold clamping ram 51 can move by an amount close to a maximum single pitch, and so that the support platen 3 can move by a further mold clamping allowance T during mold clamping.

Figure 4:
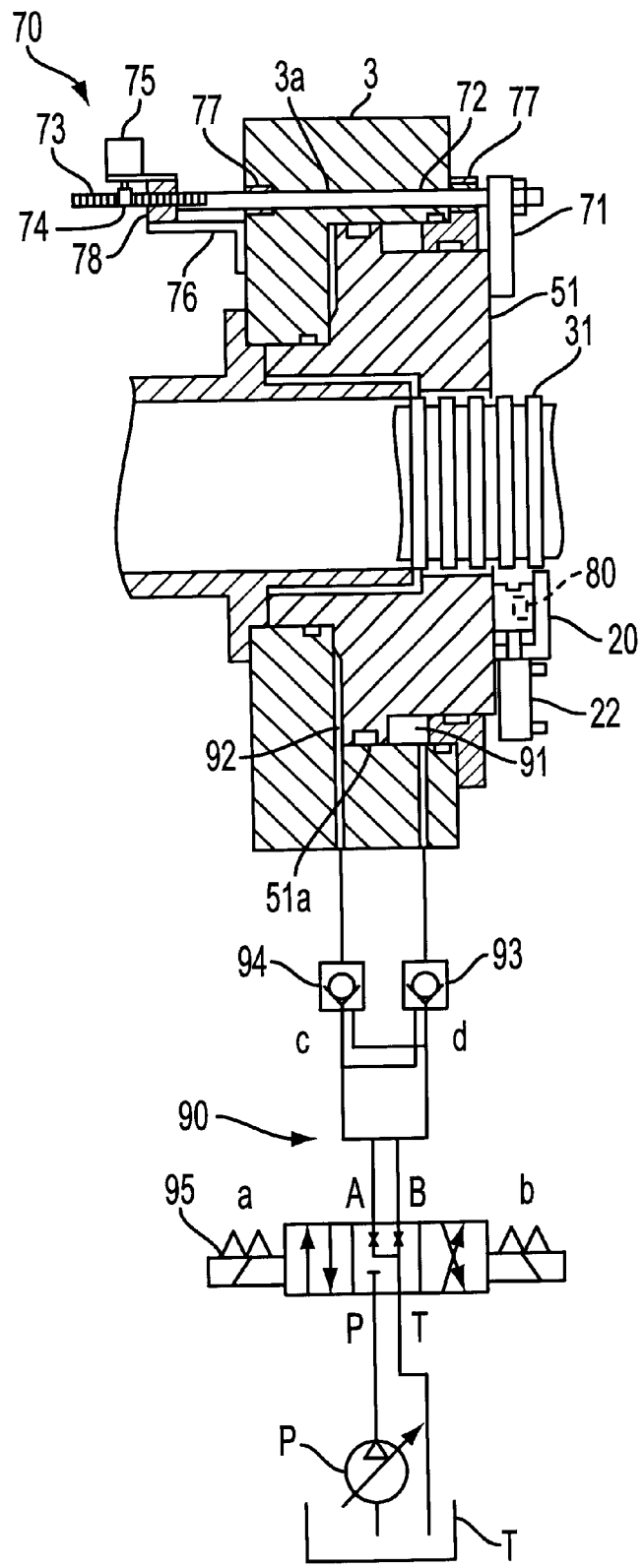
FIG. 4 is a section of the support platen and the mold clamping ram, including the first detection device and a mold clamping ram position control device according to the present invention.

The mold clamping ram 51 is stopped by a motion rod 72 of a first detector 70 described in detail in FIG. 4, so that it will not rotate around the center axis of the mold clamping device. An illustration of the detent is omitted, but a detent structure in which guide pins, for example, on the bottom surface of the mold clamping cylinder hole 50 are inserted into guide holes provided on the mold clamping ram 51 would be acceptable.

A half nut device 20 is attached to the front end surface of the mold clamping ram 51. FIG. 2 illustrates the open state of the device 20. In FIG. 2, the half nut 21 is depicted as opening and closing in the up and down direction, but in actuality it is preferable that it be arranged to open and close to the left and right, as shown in FIG. 1. An air cylinder 22 is arrayed adjacent to either side wall of the mold clamping device for ease of maintenance.

Figure 3A:
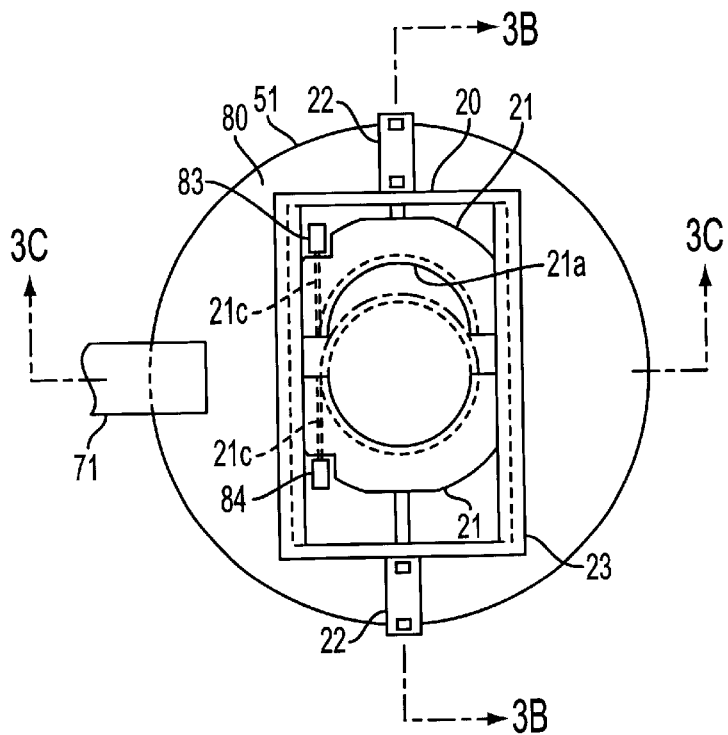
FIGS. 3A through 3C are detailed diagrams of a half nut device according to the present invention and of the second detection device.
Figure 3B:
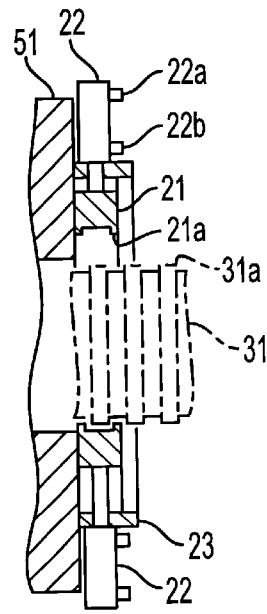

FIGS. 3A and 3B are detailed diagrams depicting a half nut device 20. In these diagrams as well, it is preferable in practice to arrange the half nut so as to open and close from left to right. To aid understanding, the half nut 21 at the top of the diagram is depicted in the retracted state, and the half nut 21 at the bottom of the diagram is shown in the advanced state whereby it is engaged with the mold clamping axle 31. The half nuts preferably advance and retract toward the mold clamping axle 31 simultaneously before and after the mold clamping operation.

The half nut device 20 is attached so that its center conforms to the axial center of the mold clamping ram 51, and the half nut 21 is housed in such a way that it is guided by a guide rail frame 23 on both sides of the mold clamping axle 31. The air cylinder 22 is provided so that the half nuts 21 advance and retract toward the mold clamping axle 31. The rods therein are connected to the half nuts 21. A sensor 22b detects when the half nut 21 has advanced and engaged the mold clamping axle 31, and a sensor 22a detects when the half nut 21 has retracted and engagement with the mold clamping axle 31 has been released. These sensors are known parts, attached to the air cylinder 22, and preferably built into the cylinder.

The tooth 21a which meshes with the mold clamping axle 31 annular protuberance 31a described above is formed on the end surface of the half nut 21 facing the mold clamping axle 31. The tooth 21a is formed such that it contacts the annular protuberance 31a over as large a surface area as possible, i.e., over approximately its semi-circumference, while the tooth thickness is formed in such a way as, to engage the annular protuberance 31a while maintaining an appropriate gap in axid direction of the mold clamping axle 31 reciprocation. A formation of greater than 2 teeth is used when the mold clamping force is large, so that the mold clamping force load will be distributed over the entire annular protuberance 31a tooth surface through the multiple teeth 21a.

In the above structure, a single mold clamping ram 51 clamps the mold clamping axle 31 by pressing down at the center axis of the mold clamping device through the set of half nuts 21 at the time of mold clamping. Thereby, the mold clamping force is applied accurately, uniformly, and straight with respect to the movable platen. The mold clamping force is preferably hydraulically controlled so that an accurate and stable mold clamping force can be obtained.

The mold clamping apparatus 1, is provided with a mold thickness adjustment device comprising a first detector 70, a second detector 80, and a mold clamping ram position control device 90, so that they control a mold thickness adjustment as described below, and hold the mold clamping ram 51 to the mold thickness adjustment position, as described below, during mold opening and closing.

The first detector 70, as shown in FIG. 4, detects the relative position of the mold clamping ram 51 through a connecting piece 71 by means of the motion rod 72. encoder 75, a pinion 74, and a rack 73. The rotary encoder 75 is affixed to the back side of the support platen 3 by means of a bracket 76, and the pinion 74 is affixed to the rotary encoder 75 detection axis. The rack 73 engages the pinion 74 and is affixed coaxially or in parallel to the tip of the motion rod 72. The rack 73 is affixed to the mold clamping ram 51 through a connecting piece 71 by means of the motion rod 72. The motion rod 72 is attached so as to be movable backward and forward, penetrating the support platen 3 through-hole 3a. The motion rod 72 may also be an integral piece with the rack 73. Reference numeral 77 is a sliding hub for the motion rod 72. Reference numeral 78 denotes a hub for the rack 73. In the first detector 70 of this type, the relative position of the half nut device 20 with respect to the support platen 3 is detected by the rotary encoder 75 as the rack 73 advances and retracts. The rotary encoder 75 will have almost the same structure whether it is provided on the side or the front, rather than the back side of the support platen 3. In those cases, the support platen 3 through-hole 3a is not necessary, and the motion rod 72 will be arrayed at the side or the front of the support platen 3.

Figure 3C:
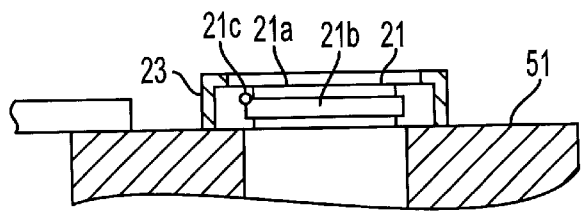

The second detector 80, as shown in FIGS. 3A through 3C, is an optoelectric detector comprising a light projection element 83 and light receiving element 84. The elements 83 and 84 detect when the half nut device 20 has reached a specified position with respect to the annular protuberance 31a as the half nut device 20 advances with the mold clamping ram 51 during the mold thickness adjustment described below.

The light projection element 83 is attached to one of the half nuts 21, and the light receiving element 84, is attached to the other of the half nuts 21. A light beam through-hole 21c, through which the detection light passes between the light projection element 83 and the light receiving element 84, is formed so as to be respectively parallel to and coaxial with the opening and closing direction of the half nuts 21. The center of this light beam axis through-hole 21c is formed on approximately the front edge of the perimeter of the tooth 21a concavity 21b (upper left side in FIG. 3C). Therefore during the mold thickness adjustment discussed below, as the half nut device 20 advances, at some point the annular protuberance 31a corner ceases to interfere with the detection light beam, and at the instant when the detection light beam is received by the light receiving element 84, the half nut 21 concavity 21b is in a positional relationship such that it meshes with the annular protuberance 31a. Furthermore, regardless of the open/closed state of the half nut 21, the second detector 80 detects the corner of the annular protuberance 31a.

In this manner, the light projection element 83 and the light receiving element 84 are directly connected on the half nut 21, so that the second detector 80 is made more compact and fits inside the half nut device, and, as the detected light beam passes through the half nut 21 there is no external interference from other environmental light which may be received. Adjustment of the attachment position is also unnecessary.

As shown in FIG. 4, the hydraulic lines d and c are connected to the mold opening oil chamber 91 and mold closing oil chamber 92, on respective ends of the piston 51a, and are in turn connected to a mold clamping ram position control device ("ram position control device" below) 90 in order to hold the mold clamping ram 51 at a specified position with respect to the support platen 3. The ram position control device 90 is a hydraulic device which comprises a direction control valve 95 as a switchover valve, pilot check valves 94 and 93 provided on the lines c and d, a hydraulic pump P capable of controlling the flow and pressure of hydraulic fluid supplied to the direction control valve 95, and a hydraulic tank T. The direction control valve 95 can be, for example, a double solenoid four port, three position switchover valve. At its intermediate position, only the P port from the pump P is blocked, and the tank T is connected to the port A and the port B, mediated by a valve throttle. The check valves 93 and 94 are valves in which a check valve opens under an external pilot pressure; they are pilot piped in such a way that the hydraulic fluid in the hydraulic lines c and d are mutually supplied as the external pilot pressure for the other check valve. The hydraulic pump P is a variable capacity pump capable of variably controlling output pressure and flow. The flow control valve and pressure control valve may of course be provided separately from the pump.

The hydraulic circuit is similar to the hydraulic device circuit used for mold clamping and pressure relief in the mold clamping stage. Therefore the mold clamping device hydraulic circuit may be used as is. The valve normally contained in the mold clamping hydraulic circuit, for example a pressure relief anti-shock valve, can be used. Diagrams and explanation of relief valves etc., normally provided in a hydraulic circuit, are here omitted as this is known technology.

Figure 5:
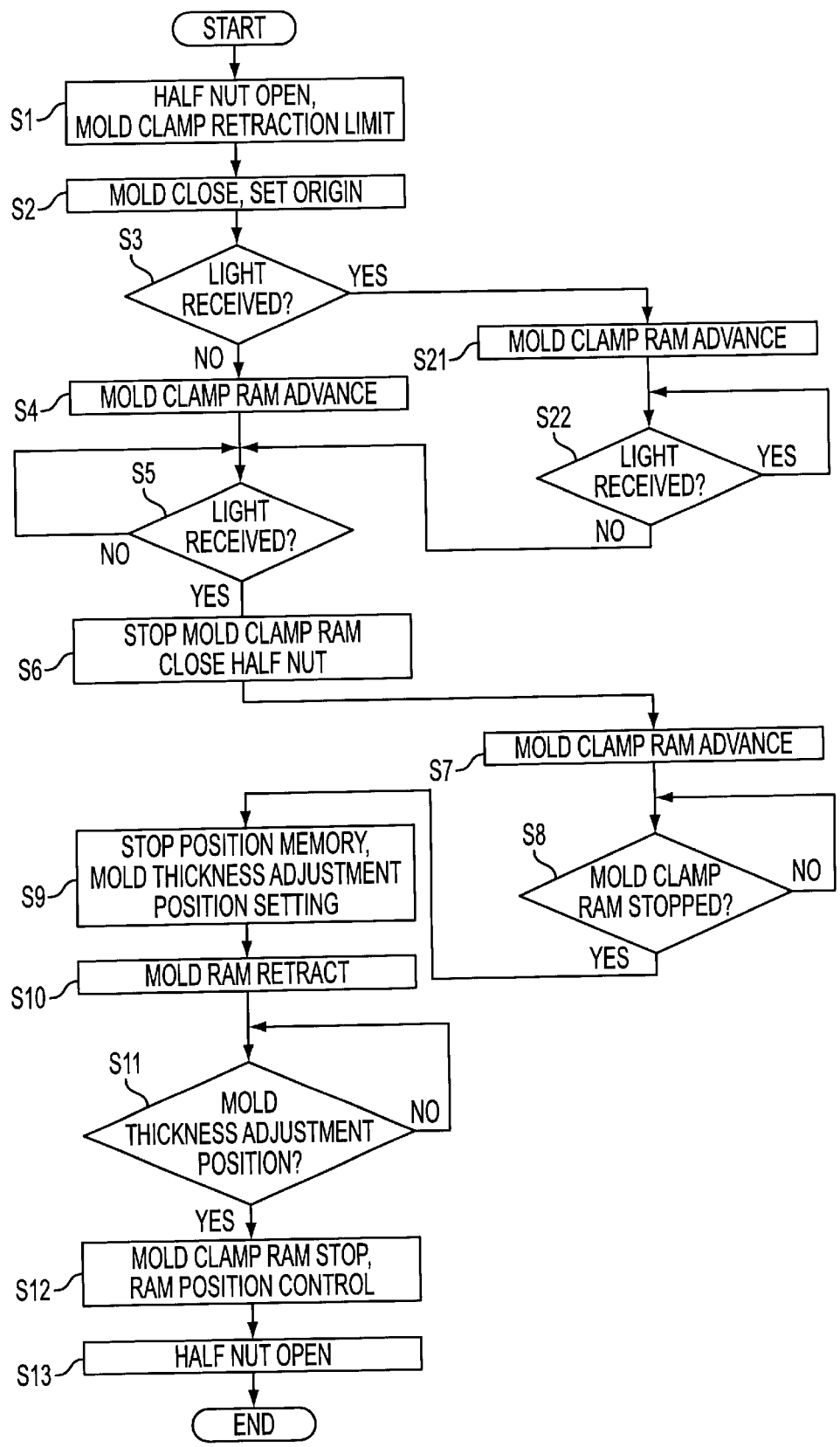
FIG. 5 is a flow chart describing a mold clamping device mold thickness adjustment control according to the present invention.

Using the structure above, mold thickness adjustment may be performed as shown in the flow chart of FIG. 5. The positional relationships between the mold clamping ram 51, the half nut 21, the mold clamping axle 31, and the axis B of the detection light beam in the process by which the mold thickness adjustment is performed are shown in FIGS. 7A through 7F.

The mold closing operation is first performed by the servo motor 11 after a die change. The half nut 21 is opened beforehand by the air cylinder 22, and the open/close state is confirmed by the sensor 22a. The direction control valve 95 solenoid b is then excited, and a low pressure hydraulic fluid is supplied to the mold opening oil chamber 91 as the mold closing oil chamber 92 is opened to the tank T side and the mold clamping ram 51 retracts to the position of its stroke retraction limit. Verification of this retraction operation is performed by the first detector 70 (step S1).

Mold closing is then performed by the servo motor 11. When the mold closing operation is completed, the position of the support platen 3 is detected by an encoder, etc. on the servo motor 11, and that position is set as a mold opening and closing motion start stroke starting position in the molding machine control device (step S2). The relative position of the annular protuberance 31a with respect to the half nut 21 is confirmed by the absence or presence of received light in the second detector 80 (step S3).

Figure 7A:
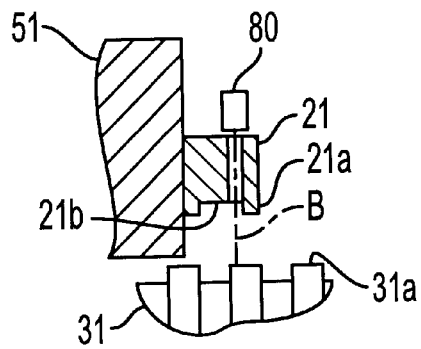
FIGS. 7A through 7F depict positional relationships between the mold clamping ram, the half nut, the mold clamping axle, and the second detection device for performing a mold thickness adjustment process according to the present invention.

At this point, as shown in FIG. 7A, if the annular protuberance 31a is blocking the axis B of the detection light beam, the molding machine control device will make a "No" determination. The direction control valve 95 solenoid a will be excited, a small flow of hydraulic fluid will be supplied to the mold closing oil chamber 92, and the mold opening oil chamber 91 will be opened to the tank side such that the mold clamping ram 51 slowly advances under a low thrust (step S4). Finally, as shown in FIG. 7C, when the axis B of the detection light beam ceases to be subject to interference by the corner of the annular protuberance 31a, the light receiving element 84 will detect received light (step S5).

Figure 7B:
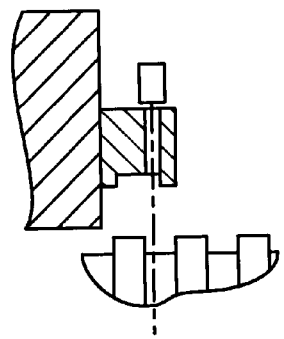
Figure 7C:
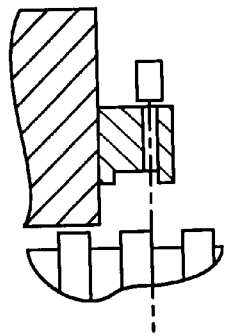

As shown in FIG. 7B, when the annular protuberance 31a is not blocking the axis B of the detection light beam immediately following mold closing, the mold clamping ram 51 will slowly advance under a low thrust as in step S4 (step S21). Finally, the annular protuberance 31a will reach the state of blocking the axis B of the detection light beam, as shown in FIG. 7A (step S22). This is the state in which a "No" was determined in step S3. Therefore, the mold clamping ram 51 will continue to advance until received light is detected by the light receiving element 84 in step S5.

If no light is ever detected at step S5, i.e. in the case of some anomaly, a "No" will continue to be determined at this step indefinitely, and the process described below will be followed. This process is the normally implemented control of anomaly processing, and a flow chart is therefore omitted. As one example, the molding machine control device can be provided with a timer, and the time elapsed from the commencement of advance by the mold clamping ram 51 in step 4 measured, so that an anomaly can be determined by this elapsed time. In such a case, each time a "No" is determined in step S5, a determination is made as to whether or not the measured time has exceeded a preset time limit; when the time limit is exceeded, the mold thickness adjustment is interrupted as anomalous. In another example, the first detector 70 uses the detected mold clamping ram 51 position data to determine an anomaly by comparing it with a mold clamping ram 51 motion limit position.

Figure 7D:
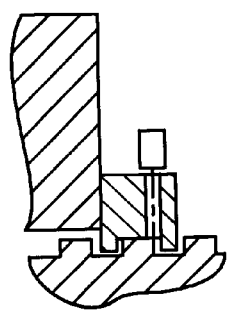
Figure 7E:
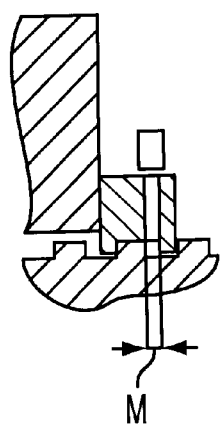

When the fact that light has been received by the light receiving element 84 is detected (step S5), the direction control valve 95 returns to the intermediate position on the basis that the half nut tooth 21a concavity 21b has reached a position opposite the annular protuberance 31a, and the mold clamping ram 51 stops at that position. The half nut 21 is then closed by the air cylinder 22, and the state shown in FIG. 7D is reached (step S6). At this time, the second detector 80 is attached at a position as described above, such that the tooth 21a and the annular protuberance 31a just mesh, but in a strict sense they do not necessarily mesh at a fixed relative distance. The mold clamping ram 51 therefore again advances slowly under weak thrust until the front side of the tooth 21a contacts the back side of the annular protuberance 31a (step S7). Then, as shown in FIG. 7E, the tooth 21a contacts the annular protuberance 31a and the mold clamping ram 51 stops (step S8). This stopped position is detected, for example, by the fact that the position of the mold clamping ram 51 detected by the first detector 70 ceases to increase over a given time period—i.e. it is detected by the speed of the mold clamping ram 51. It is also possible to determine the stopped state using the pressure rise in a pressure switch provided on the hydraulic line c (not shown).

Next, the mold clamping ram 51 stopping position is detected by the first detector 70 and recorded in the control device. A (retracted) position determined by subtracting the approximately 0.5 mm gap L distance from the recorded stopping position is then set as the half nut device 20 mold thickness adjustment position in the molding machine control device (step S9). The maximum gap M between the tooth 21a and the annular protuberance 31a is approximately 3 mm; these gaps are appropriately selected based on the size of the mold clamping device.

Figure 7F:
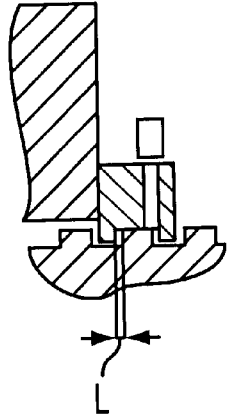
Figure 8:
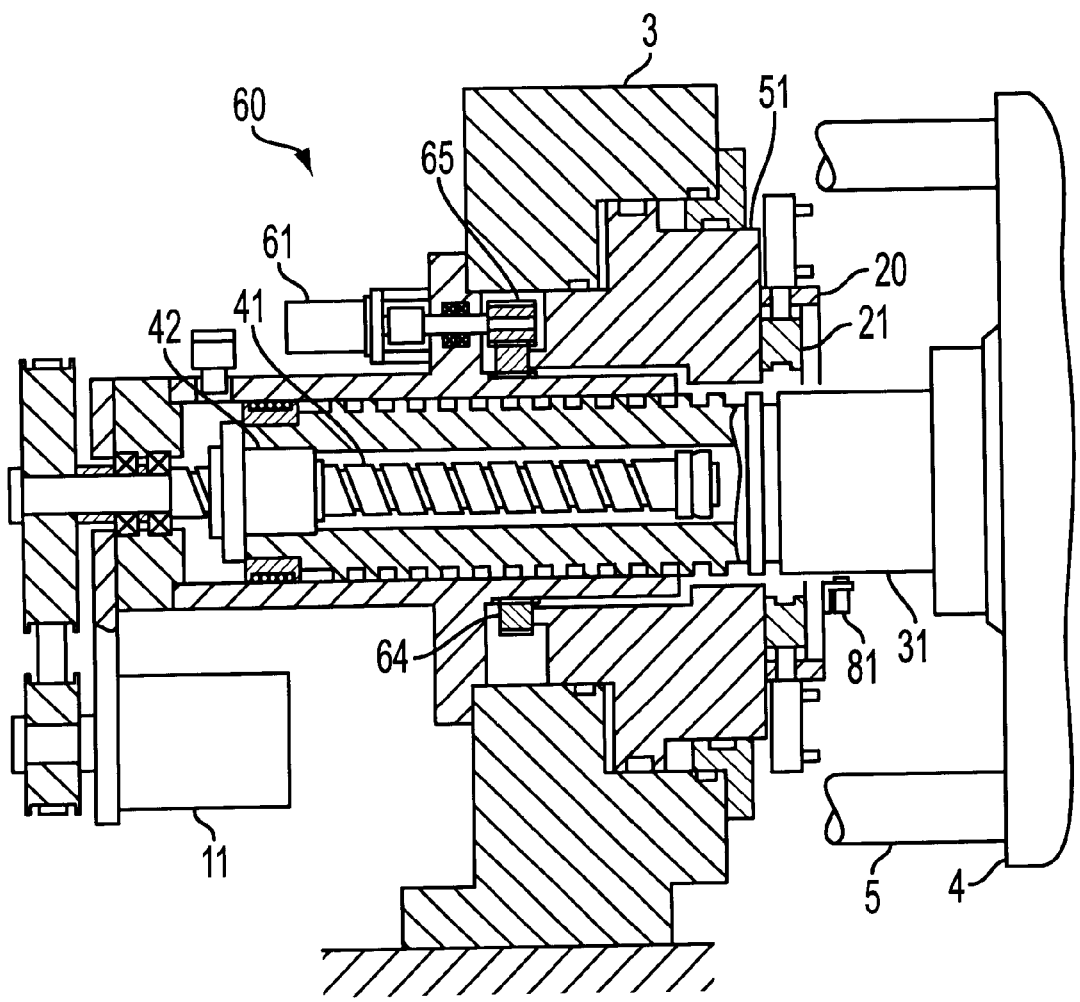
FIG. 8 is a side sectional view showing major portions behind the movable platen in the mold clamping device of Japanese Patent Application H10-108618.

Hereafter the direction control valve 95 solenoid b is excited, a low pressure hydraulic fluid is supplied to the mold opening oil chamber 91, and the mold clamping ram 51 retracts to the mold thickness adjustment position (step S10). Then, as shown in FIG. 7F, when the fact that the mold clamping ram 51 has retracted to the mold thickness adjustment position is detected by the first detector 70 (step S11), the mold clamping ram 51 again stops and the ram position control device 90 holds the mold clamping ram 51 in this mold thickness adjustment position (step S12). The half nut 21 is then opened while still being held at the mold thickness adjustment position (step S13). Anomaly processing based on step S5 above is also invoked when the first detector 70 detects that the mold clamping ram 51 has not retracted to the mold thickness adjustment position in step S11.

Thus, mold thickness adjustment is performed using the first detector 70, the second detector 80, the mold clamping axle 31, the mold clamping ram 51, and a set of half nuts 21, and can therefore be relatively simply controlled. Because the movement of the mold clamping ram 51 is implemented using the mold clamping device hydraulic circuit, the mold thickness adjustment device is uncomplicated and its control is also easily implemented. When the half nut 21 tooth 21a once contacts the annular protuberance 31 a of the mold clamping axle 31, the mold thickness adjustment position is set based on that position, so the mold thickness adjustment position is accurately set.

After mold thickness adjustment, the half nut device 20 is held at the mold thickness adjustment position by having the ram position control device 90 hold the mold clamping ram 51 position with respect to the support platen 3 position at the mold thickness adjustment position. When the mold clamping ram 51 position is removed from the mold thickness adjustment position, one of the solenoids a or b on the directional control valves 95 is excited, and fluid is supplied to either the mold opening oil chamber 91 or the mold closing oil chamber 92 to implement control. For example, when the position of the mold clamping ram 51 is moved forward of the mold thickness adjustment position, the molding machine control device excites the direction control valve 95 solenoid b, supplying hydraulic fluid to the mold opening oil chamber 91, and the mold clamping ram 51 position is returned to the mold thickness adjustment position. When the mold clamping ram 51 position is in the mold thickness adjustment position, the direction control valve 95 is in the intermediate position, and the check valves 93 and 94 along the hydraulic tube cause a certain degree of back pressure to be maintained in the mold opening oil chamber 91 and the mold closing oil chamber 92. Thus, the position holding control described above does not become unstable. In this manner, when the half nut 21 is closed following the mold closing operation, the half nut device 20 is accurately held at the mold thickness adjustment position in such a way that the gap between the tooth 21a mold clamping axle 31 front surface and the mold clamping axle 31 annular protuberance 31 a rear surface has a fixed value L.

The mold opening and closing operation and the mold clamping operation are carried out as described below. In the beginning of the mold opening operation, particularly, it is preferable to take advantage of the merits of the structure of the mold clamping device according to the present invention to select strong mold opening control as described below in connection with FIG. 6.

In conventional mold opening operations, depending on the shape of the item being formed, a large mold opening force may be required when first opening the die. Furthermore, that mold opening force may increase with the preferability of using hydraulic force to generate it.

On the other hand, a mold clamping device according to the present invention comprises an electromechanical mold opening and closing mechanism and a mold clamping ram 51 hydraulic mold clamping mechanism on the center axis of the mold clamping device, the movement stroke of the mold clamping ram 51 being large. As explained below, the mold opening force of the mold clamping ram 51 is not directly loaded onto the mold opening and closing screw axle 41, the mold opening and closing,nut 42, or the bearings 43.

Using the structure of the mold clamping device according to the present invention, it is possible to enable the mold opening operation to be performed by either of two modes: a standard mold opening mode, or a strong mold opening mold. In other words, the mode is selected in the molding machine control device before the commencement of the molding operation. In the standard mold opening mode, all mold opening and closing operations are performed by the servo motor 11. In the strong mold opening mode, the mold opening operation is started by use of the mold clamping ram 51. In the strong mold opening mode, both the hydraulic force to retract the mold clamping ram 51, i.e., the initial mold opening force, and the postion to which the mold clamping ram 51 retracts at the beginning of the mold opening operation, i.e., the initial mold opening position, are set in the mold machine control device, A return position to which the mold clamping ram is returned approximately 0.5 mm from the initial mold opening position is set in the injection molding machine control device as a return postion, so that the half nut 21 will open without contacting the annular protuberance 31a. The initial mold opening position sets the distance by which the die 7, i.e. the movable platen 4, actually opens; it is not the distance which the mold clamping ram 51 actually moves. The distance which the mold clamping ram 51 actually moves is the distance to which the gap M has been added, as shown FIG. 7e.

During the mold closing operation, the sero motor 11 rotates at high speed with the half nut 21 in an open state, such that the mold opening and closing screw axle 41 rotates at high speed. The mold opening and closing nut 42 therefore advances at high speed, and the mold clamping axle 31, which is prefreably integrally formed therewith, advances such that the movable platen 4 closes the mold at high speed. When the movable platen 4 reaches the mold opening and closing motion start position, rotation of the servo motor 11 cases, the movable platen 4 stops, and the half nut device 20 closes, completing the mold closing. At this time, the mold clamping ram 51 is held to the half nut device 20 mold thickness adjustment position as described above, such that the half nut 21 always meshes with the mold clamping axle 31.

Next, mold clamping is performed. When the direction control valve 95 solenoid a is excited, a high pressure is exerted on the mold closing oil chamber 92, the mold opening oil chamber 91 is opened to the tank side, the mold clamping ram 51 advances and the half nut 21 pushes forward against the mold clamping axle 31. By this means the movable platen 4 is pressed down, and the mold clamping force is exerted on the movable platen 4.

When switching from the mold closing operation to the mold clamping operation, the distance moved by the half nut 21 with respect to the mold clamping axle 31 is just the gap L described above. Therefore the switchover operation to the mold clamping operation after mold closing can be accomplished in a short time and without generating shock, etc. When mold clamping is performed, the tie bars 5 are stretched by the mold clamping force, and the support platen 3 retracts by the mold clamping allowance T with respect to the fixed platen 2. In other words the mold opening and closing screw axle 41 retracts with respect to the mold clamping axle 31, that is with respect to the mold opening and closing nut 42, but the mold opening and closing screw axle 41 is allowed to rotate by an amount corresponding to the mold clamping allowance T. Therefore no mold clamping force is directly loaded onto the mold opening and closing screw axle 41, the mold opening and closing nut 42, or the bearings 43. By detection of the amount of rotation of the mold opening and closing screw axle 41 using the servo motor 11 encoder, the amount of support platen 3 retraction, i.e. the mold clamping allowance T, is accurately detected.

Next, injection filling is performed by means of an injection machine (not shown). In case an overpack occurs, the movable platen 4 retracts, and the mold clamping ram 51 also attempts to retract through the mold clamping axle 31 and the half nut 21. At this time, when using a mold clamping device according to the present invention, the above-described ram position control device 90 holds the mold clamping ram 51 in the mold clamping position by means of hydraulic force, thereby permitting retraction of the mold clamping ram 51 to be permitted without directly loading the overpack force onto the tie bars 5. More specifically, for example, a known relief valve (not shown) can be added in the piping from the mold closing oil chamber 92 to the pilot check valve 94. If the set relief pressure of this relief valve is set to a pressure 5% above the mold clamping hydraulic pressure, it is possible to reliably relieve the mold closing oil chamber 92 hydraulic fluid when an overpack occurs. The overpack state can be easily removed by relieving the pressure in the mold closing oil chamber 92, permitting the retraction of the mold clamping ram 51.

Figure 6:
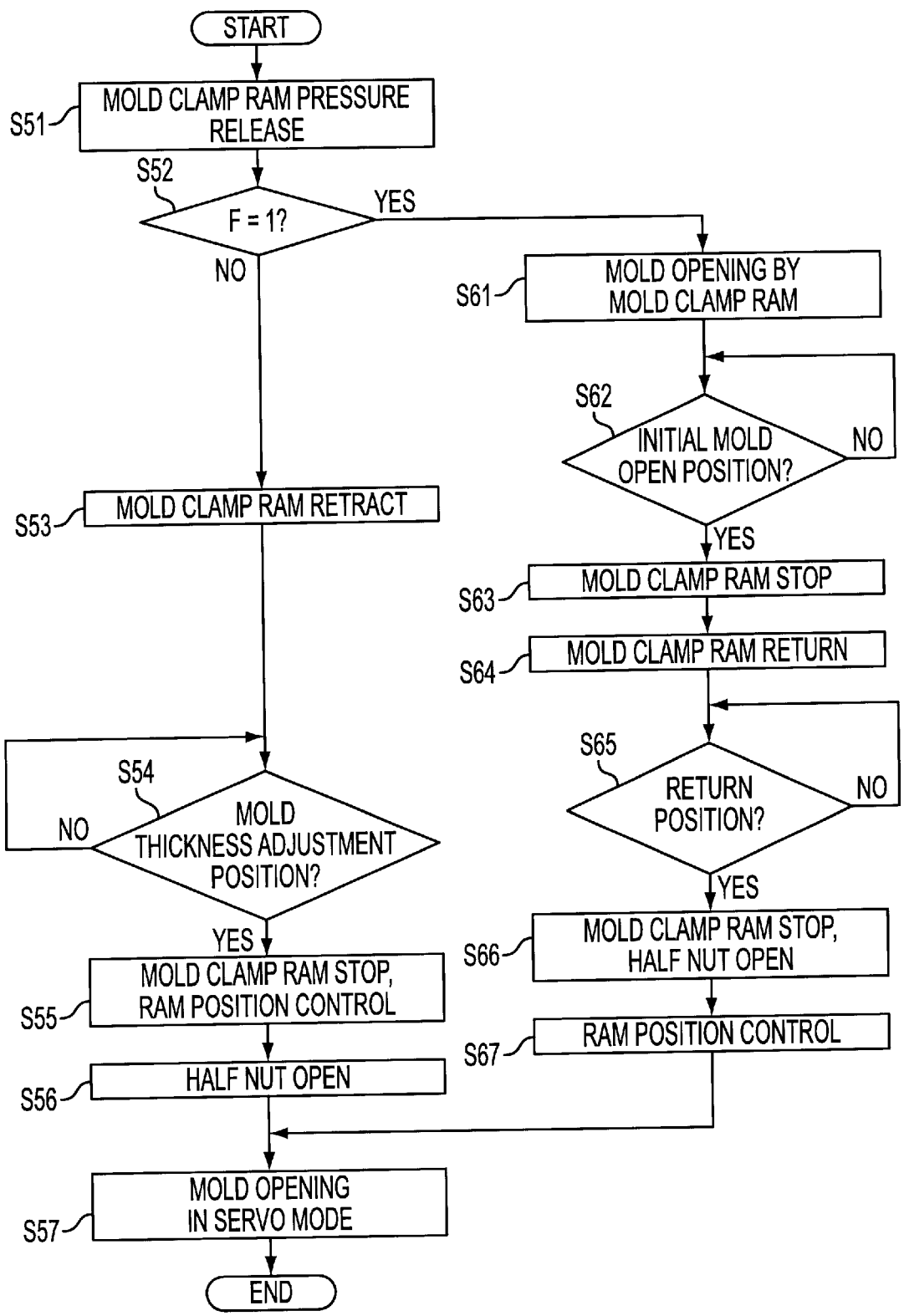
FIG. 6 is a flow chart describing a mold clamping device mold opening control, according to the present invention.

Next, mold opening control, performed as shown in FIG. 6, will be discussed. When the strong mold opening mode is selected, the injection molding machine control device mode flag F goes to "1"; and when the standard mold opening mode is selected, the mode flag F stays at "0". This is only one example of a differentiating method.

Mold opening normally occurs using a mold having a standard mold opening, so that mode will be explained first. At the commencement of the mold opening operation, the direction control valve 95 solenoid b is excited, thereby exerting hydraulic pressure on the mold opening oil chamber 91. The mold closing oil chamber 92 is open to the tank side, i.e., pressure is relieved, and therefor the mold clamping force is removed (step S51).

Next, the mold opening mode is determined by means of the mode flag F (step S52). When operating in the standard mold opening mode F=0, so a "No" determination is made at step S52, and retraction of the mold clamping ram 51 commences at a low hydraulic pressure (step S53). When the mold clamping ram 51 reaches the mold thickness adjustment position during this retraction operation (step S54), the mold clamping ram 51 stops and is hydraulically held in that position by the ram position control device 90 (step S55), and the half nut device 20 opens (step S56). Then the mold clamping ram 51 is hydraulically held in the mold thickness adjustment position by the ram position control device 90 in this manner, mold opening control is performed by the servo motor 11 (step S57). The mold opening force is thus imparted only by the servo motor 11.

In this mode, the amount of retraction by the mold clamping ram 51 to the mold thickness adjustment position is equivalent to the gap L in the mold thickness adjustment as described above, which is very small. This enables a fast shift to the mold opening motion, as well as simple operation.

In the strong mold opening mode, pressure relief is similarly implemented (step S51). Next, the mold opening mode is determined (step S52). In the strong mold opening mode F=1, so a "Yes" is determined, and retraction of the mold clamping ram 51 commences with the half nut device 20 continuing to be closed (step S61). At this time, the mold opening oil chamber 91 mold opening pressure is set by the initial mold opening force. When the mold clamping ram 51 finally retracts to the position to which the half nut 21 pulls the mold clamping axle 31, the hydraulic pressure applied to the mold opening oil chamber 91 will rise such that it approaches the initial mold opening force. When the mold opening force reaches the force at which the mold can be opened, the die will begin to open. When the first detector 70 detects that the die has been forcibly opened and the mold clamping ram 51 retracted position has reached the initial mold opening position (step S62), the mold clamping ram 51 stops (step S63). The initial mold opening operation is thus performed until the initial mold opening position is reached by the initial mold opening force. At this point, the mold clamping ram 51 retracts with respect to the support platen 3, and the mold opening and closing nut 42, along with the mold clamping axle 31, retracts with respect to the mold opening and closing screw axle 41 by the same distance. The mold opening and closing screw axle 41 is permitted to rotate only by an amount corresponding to the travel distance. Therefore, the initial mold opening force from the mold clamping ram 51 is not directly applied to the mold opening and closing screw axle 41, the mold opening and closing nut 42, or the bearings 43.

Next, the mold clamping ram 51 begins a return motion to a position which is 0.5 mm back from the initial mold opening position, i.e., to the return position described above (step S64). When the first detector 70 detects that the mold clamping ram 51 has reached the return position (step S65), the mold clamping ram 51 stops at that position, and the half nut 21 is opened (step S66). The above described ram position control is then performed, and when the mold clamping ram 51 has been returned to the mold thickness adjustment position (step S67), the system returns to the standard mold opening mold step S57. Mold opening control by means of the servo motor is then performed as described above. Step S67 may also be carried out simultaneously with step S57.

In this manner, for molding operations which require a large initial mold opening force, the requisite initial mold opening force and the initial mold opening position at which the mold is opened under this force may be set, and the mold opening operation may be performed in the strong mold opening mode at the beginning of mold opening. Because the initial mold opening force at this time is generated by hydraulic force, the initial mold opening force upper limit will be as set. Also, when using a mold clamping device structure according to the present invention, there is no direct loading of the initial mold opening force on the mold opening and closing screw axle 41, the mold opening and closing nut 42, and the bearings 43 used for mold opening and closing. Force is loaded only on the mold clamping axle 31. Furthermore, the mold is opened using a single mold clamping ram 51, so an accurate mold opening force operates on the center of the movable platen 4.

Compression molding can also be easily performed using a mold clamping device according to the present invention. For example, compression molding according to the following operation can be effected. First the half nut 21 is closed after the mold is closed, and the mold clamping ram 51 is retracted while the first detector 70 feeds back the mold clamping ram 51 position. The movable platen 4 is then retracted by a sepecified amount and a gap of a specified degree is formed between the fixed die 6 and the movable die 7. Next, molten resin is injected and the die cavity (not shown) is filled with the mold clamping ram 51 held in position by mold clamping ram position control device 90. The mold clamping ram 51 then advances such that the fixed die 6 is bound to the movable die 7 in accordance with the degree of completion of the filling operation. Finally, sufficient resin is transferred to fill the die cavity. Other examples is a molding method in which a mold clamping force is gradually increased under a constant pressure, and a loosening molding method. In either case, the mold clamping ram 51 position is detected by the first detector 70 and is accurately position controlled by the ram position control device 90, so that position adjustment and mold clamping force adjustment of the movable platen 4 after mold closing can be easily effected.

I claim:

1. A mold opening control method for an injection molding machine, said injection molding machine performing mold opening and closing by moving a mold clamping axle of a movable platen with a mold opening and closing screw rotating by a servo motor, performing mold clamping by pushing a mold clamping ram in a support platen hydraulically with a half nut device closed, said half nut device having half nuts attached to the mold clamping ram, and said half nuts meshing with protuberances of the mold clamping axle, and performing a mold thickness adjustment by a first detection device for detecting the relative position of the mold clamping ram with respect to a support platen, a second detection device for detecting the position at which the half nut device engages the mold clamping axle, and a mold clamping ram position control device for hydraulically controlling a position of the mold clamping ram with respect to the support platen, comprising:

making a selection between two mold opening modes: a standard mold opening mode in which the mold opening operation is performed by the servo motor with the half nut device open, and a strong mold opening mode, said mode comprising the step of:

initially retracting the mold clamping ram hydraulically and strongly with the half nut device continuing to be closed and with the first detection device detecting the mold clamping ram position, stopping the mold clamping ram at an initial mold opening position where the movable platen actually opens, returning the mold clamping ram to a return position where the half nuts opens without contacting the protuberances of the mold clamping axle, stopping the mold clamping ram at the return position, opening the half nuts, returning the mold clamping ram to the mold thickness adjustment position hydraulically, and, shifting to the strong mold opening mold step to the standard mold opening mold step.

2. An injection molding machine mold clamping apparatus including a fixed platen, a moveable platen having a mold clamping axle with protuberances formed on an outer circumference of the molding clamping axle at a fixed pitch, and a support platen having a mold opening and closing screw axle axially supported by the support platen, a mold opening and closing nut axially supported in said clamping axle and meshing with said screw axle, and a servo motor connected to rotate the mold opening and closing screw axle, said mold clamping apparatus comprising:

a mold clamping mechanism having a mold clamping ram in the support platen coaxial with said clamping axle, a half nut device having a pair of half nuts attached to the end of the mold clamping ram, said half nuts meshing with the protuberances of the mold clamping axle; and a mold thickness adjustment device having a first detection device for detecting the relative position of the mold clamping ram with respect to the support platen, a second detection device for detecting the relative position of the half nut device with respect to the protuberances of said clamping axle, and a mold clamping ram position control device for hydraulically controlling a position of the mold clamping ram with respect to the support platen;

whereby mold opening and closing is performed by rotation of the mold opening and closing screw axle by the servo motor with the half nut device in an open state, and mold clamping is preformed by pushing the mold clamping axle by means of the mold clamping ram, mediated by the half nuts, with the half nut device in a closed state, and a mold thickness adjustment is performed in such a way that the second detection device detects a mold thickness adjustment position at which the halfnuts engage the mold clamping axle, and that the first detection device feeds back the relative position of the mold clamping ram with respect to the support platen, and that the mold clamping ram position control device hydraulically controls the holding of the mold clamping ram to said mold thickness adjustment position except mold clamping.

3. The injection molding mold clamping apparatus according to claim 2, wherein the mold clamping ram position control device comprises at least a switchover valve, which controls switchover of hydraulic fluid supplied either to a mold clamping-side oil chamber or to a mold opening-side oil chamber on the mold clamping ram, two pilot check valves, a flow control valve, a pressure control valve, and a pilot check valve.

4. The injection molding machine mold clamping apparatus according to claim 2, wherein the second detection device comprises an optoelectric detector on a half nut of the half nut device, wherein a light beam through-hole is formed in the half nut, through which light may pass between the optoelectric detector light projection element and light receiving element for detection.

\* \* \* \* \*